(12) United States Patent
Klapperich

(10) Patent No.: US 12,006,162 B2
(45) Date of Patent: *Jun. 11, 2024

(54) DEVICE AND METHOD FOR SEPARATING PIECE GOODS

(71) Applicant: Becton Dickinson Rowa Germany GmbH, Kelberg (DE)

(72) Inventor: Andreas Klapperich, Rieden (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,515

(22) Filed: Jun. 12, 2023

(65) Prior Publication Data

US 2023/0322500 A1 Oct. 12, 2023

Related U.S. Application Data

(63) Continuation of application No. 17/322,588, filed on May 17, 2021, now Pat. No. 11,718,486, which is a
(Continued)

(51) Int. Cl.
*B65G 47/51* (2006.01)
*B65G 47/91* (2006.01)
*G06T 7/70* (2017.01)

(52) U.S. Cl.
CPC ....... *B65G 47/5104* (2013.01); *B65G 47/912* (2013.01); *B65G 47/917* (2013.01); *G06T 7/70* (2017.01)

(58) Field of Classification Search
None
See application file for complete search history.

(56) References Cited

U.S. PATENT DOCUMENTS 9,272,421 B2 3/2016 Subotincic
9,486,926 B2 11/2016 Kawano
(Continued)

FOREIGN PATENT DOCUMENTS

DE 4318341 A1 10/1994
DE 10225332 A1 1/2004
(Continued)

OTHER PUBLICATIONS

Extended European Search Report for Application No. 20153602.6, dated Jul. 10, 2020, 12 pages.
(Continued)

*Primary Examiner* — William R Harp
(74) *Attorney, Agent, or Firm* — Morgan, Lewis & Bockius LLP

(57) ABSTRACT

Devices for separating piece goods such as pharmaceutical product packages to be stored in a picking device are provided. The device includes a feed device for piece goods, a recording device for recording 3D images of piece goods, a control device for evaluating 3D images and for determining a piece good to be picked, a conveyor for picking a piece good, a deposit surface, and a lateral recording device. The control device is configured so that the orientation of the picked piece good is ascertained and the preferred storage surface is established and that the conveyor is activated in such a way that a picked piece good is situated on a preferred storage surface on the deposit surface. Methods of separating piece goods to be stored in a picking device are also provided.

20 Claims, 5 Drawing Sheets

Related U.S. Application Data continuation of application No. 16/751,616, filed on Jan. 24, 2020, now Pat. No. 11,040,836.

(56) References Cited

U.S. PATENT DOCUMENTS

| | | | |
|---|---|---|---|
| 9,498,798 | B2 | 11/2016 | Hellenbrand |
| 10,023,396 | B2 | 7/2018 | Hellenbrand et al. |
| 11,040,836 | B1 | 6/2021 | Klapperich |
| 11,176,674 | B2 | 11/2021 | Diankov et al. |
| 11,427,407 | B2 | 8/2022 | Hellenbrand |
| 11,718,486 | B2 * | 8/2023 | Klapperich .......... B65G 47/917 198/431 |

FOREIGN PATENT DOCUMENTS

| | | |
|---|---|---|
| EP | 1748004 A1 | 1/2007 |
| EP | 2194008 A2 | 6/2010 |
| IT | TO20110377 A1 | 10/2012 |
| WO | WO-2006095047 A1 | 9/2006 |
| WO | WO-2012167846 A1 | 12/2012 |

OTHER PUBLICATIONS

International Search Report and Written Opinion for Application No. PCT/EP2020/086178, dated Feb. 16, 2021, 21 page including English translation.
Singapore Office Action for Application No. 11202251466W, dated Jan. 16, 2024, 11 pages.

* cited by examiner

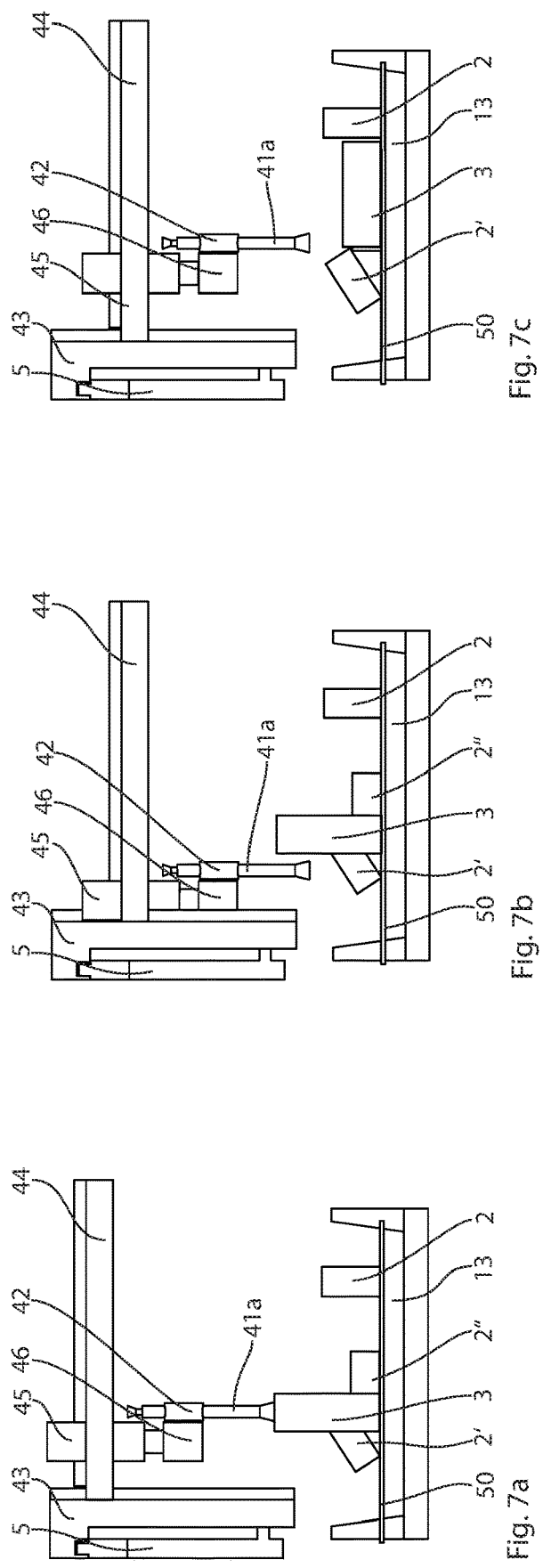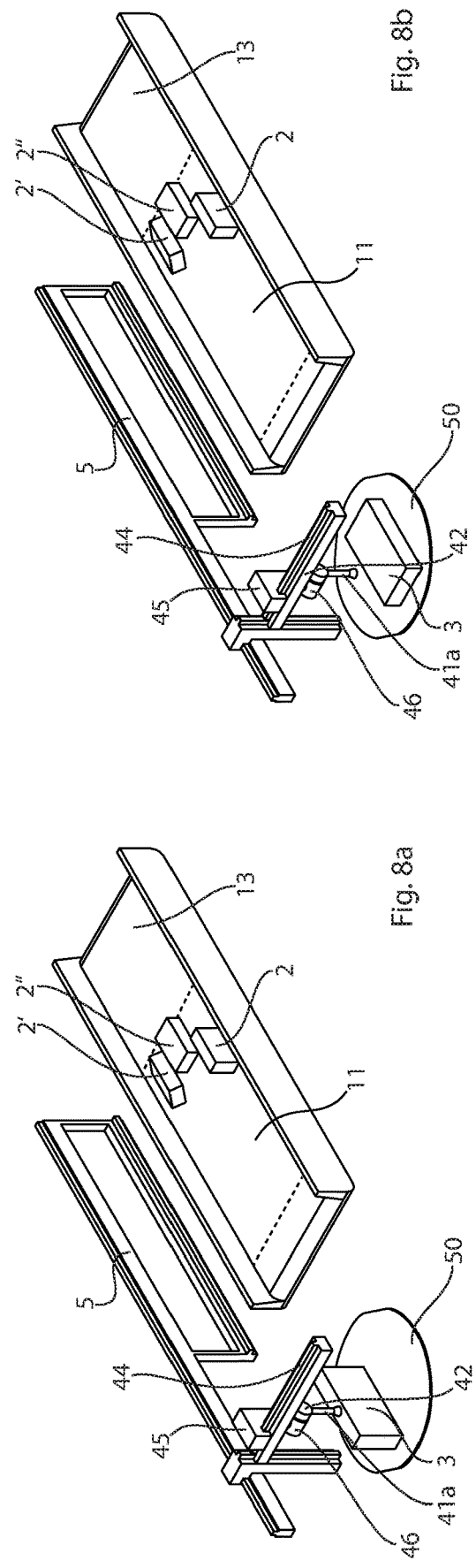

DEVICE AND METHOD FOR SEPARATING PIECE GOODS

CROSS REFERENCE TO RELATED APPLICATION

This application is a continuation of U.S. application Ser. No. 17/322,588, entitled "DEVICE AND METHOD FOR SEPARATING PIECE GOODS," filed on May 17, 2021, issued as U.S. Pat. No. 11,718,486 on Aug. 8, 2023, which is a continuation of U.S. application Ser. No. 16/751,616, entitled "DEVICE AND METHOD FOR SEPARATING PIECE GOODS," filed on Jan. 24, 2020, issued as U.S. Pat. No. 11,040,836 on Jun. 22, 2021, the entirety of which is incorporated herein by reference.

BACKGROUND

The present disclosure relates to a device and a method for separating piece goods to be stored in a picking device, and in particular for separating pharmaceutical product packages to be stored in a pharmacy picking device.

SUMMARY

One or more embodiments provide a picking device. The picking device includes a feed device, a first recording device disposed adjacent to the feed device, a second recording device disposed adjacent to the feed device, a conveyor comprising a gripper, and a control device coupled to the first and second recording devices and the conveyor, the control device configured to have the gripper pick one of a plurality of piece goods based on one or more images from the first recording device, to have the second recording device take a first image of the picked piece good, to have the gripper rotate the picked piece good by a predetermined angle about an axis, and to have the second recording device take a second image of the picked piece good.

One or more embodiments provide a method for separating piece goods to be stored in a picking device. The method includes situating, with a feed device, a plurality of piece goods in a receiving area, producing, by a first recording device disposed adjacent to the feed device, at least one first image of the plurality of piece goods, determining, by a control device, one of the plurality of piece goods to be picked based on the at least one first image, picking, by a gripper of a conveyor, the determined piece good, producing, by a second recording device disposed adjacent to the feed device, at least one second image of the picked piece good, determining, by the control device, dimensions of the picked piece good based on the at least one second image; and situating the picked piece good on a deposit surface downstream from the receiving area.

The foregoing and other features, aspects and advantages of the disclosed embodiments will become more apparent from the following detailed description and accompanying drawings.

BRIEF DESCRIPTION OF THE DRAWINGS

One or more embodiments of the device according to the disclosure and of the method according to the disclosure is described below with reference to the drawings.

FIG. 5b is a rear view of the first process situation of FIG. 5a.

FIG. 6b is a rear view of the second process situation of FIG. 6a.

FIGS. 7a-7c are front elevation views of further process situations of a method for separating piece goods to be stored in a picking device, namely, the placement and tipping of a picked piece good on the deposit surface.

FIGS. 8a and 8b are side views of different process situations of a method for separating piece goods to be stored in a picking device.

DETAILED DESCRIPTION

Figure 1A:
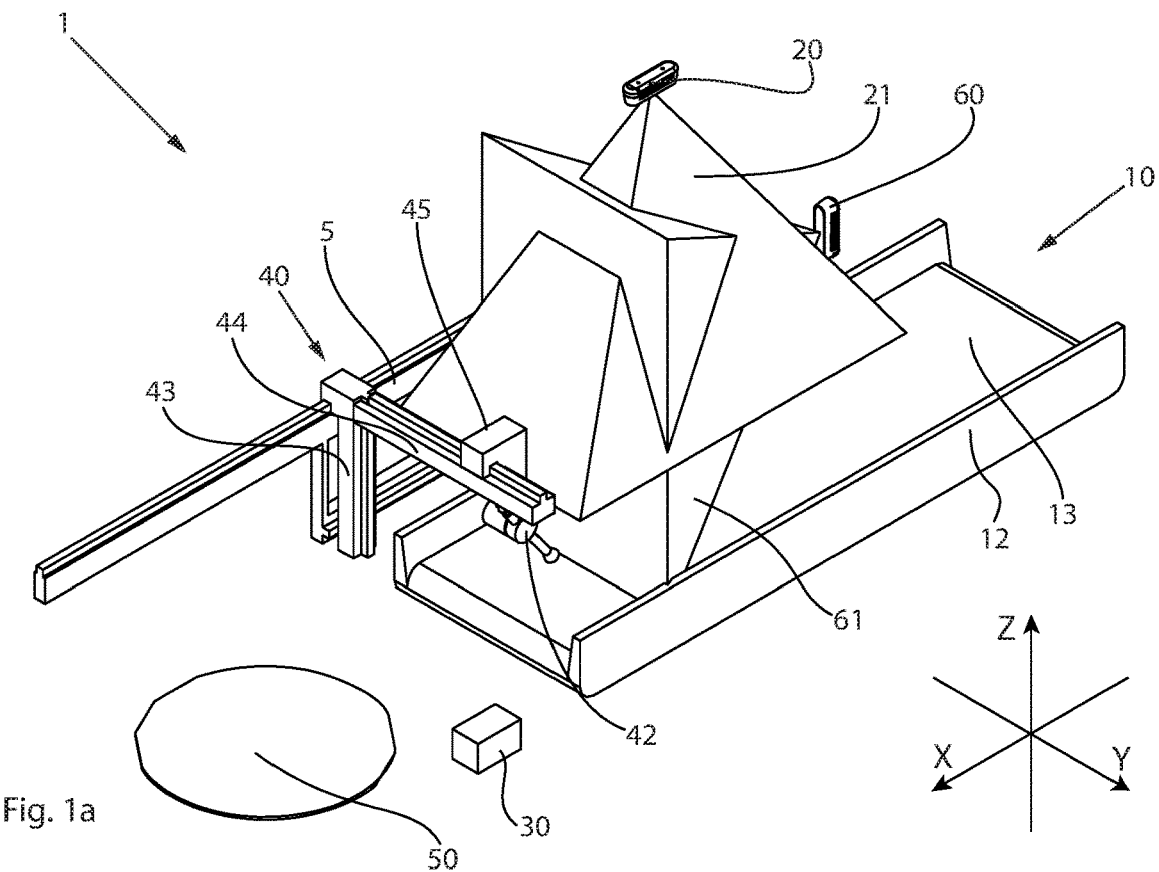
FIG. 1a is a perspective view of a device for separating piece goods to be stored in a picking device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In modern pharmacy picking devices, a variety of different pharmaceutical product packages are stored according to the principle of chaotic storage and, when necessary, are removed from storage using a control unit. The storage of the pharmaceutical product packages in this case is oriented according to the unoccupied storage spaces available in the picking device and, under the principle of chaotic storage, not on the type of pharmaceutical, i.e., the packages are not stored sorted in this type of storage. To store the pharmaceutical product packages, a user may deposit them, for example, on a storage belt, by which the pharmaceutical product packages are then moved into the picking device. With the control unit of the picking device, the pharmaceutical product packages are then picked off the storage belt and moved to and situated in a storage space predetermined by a control device. The process of storing a number of pharmaceutical product packages may be relatively time consuming, depending on the number of pharmaceutical product packages to be stored, so that it is known from the prior art to combine pharmacy picking devices with automated devices for separating piece goods. These are used to provide piece goods separated from a plurality of piece goods, which are then identified and stored.

Such devices for separating piece goods are known from the prior art. In WO 2012/167846 A1, for example, a device for separating piece goods is known, which includes a device for conveying piece goods from a stock of piece goods to a support surface of a collecting device. The conveyor separates the piece goods by moving an obliquely situated slider under the stock of piece goods, in order to thereby move a piece good onto the support surface. Depending on the size of the slider and on the piece goods of the stock, however, it may happen that not one piece good, but two or even three piece goods are moved onto the support surface. This is also contingent on how the piece goods are oriented in the stock, i.e., whether, for example, several piece goods resting on their narrowest side surface in the stock are present, which are then all moved onto the support surface with one movement of the slider. As a result, the piece goods are arbitrarily oriented on the support surface, i.e., it is not possible with the known device to provide the piece goods separately and resting on a predetermined side surface.

It is therefore an object of the present disclosure to provide a device and a corresponding method, with which it is possible to provide piece goods separately and resting on a predetermined side surface.

The object is achieved by a device according to the disclosure and by a method according to the disclosure for separating piece goods to be stored in a picking device. The device according to the disclosure includes a feed device for providing a plurality of non-separated piece goods in a receiving area extending in an X- and Y-direction of the device, an upper 3D recording device situated in the Z-direction, orthogonal to the X- and Y-directions, above the feed device for recording 3D images of piece goods situated on the feed device in the receiving area, and a control device coupled to the upper 3D recording device for evaluating 3D images ascertained with the upper 3D recording device and for determining one piece good of the plurality of piece goods to be picked up. The 3D images are evaluated using conventional image processing software with the aim of detecting different objects, namely the piece goods, in the 3D image and of establishing which piece good may be picked next or is picked next. It is thus conceivable, for example, that multiple of the plurality of piece goods rest one on top of one another, so that an underlying piece good is overlaid, for example, by an overlying piece good in such a way that only the partially overlying piece good may be picked, but not the underlying piece good. Exactly how the image processing and the determination of the piece good to be picked is carried out is irrelevant for the present disclosure; it is possible for all approaches known to those skilled in the art, in particular, under the term "machine vision" to be used.

The device according to the disclosure further includes a conveyor coupled to the control device having a gripper rotatable about the Z-axis (i.e., the vertical axis) for picking a specific piece good determined by the control device from the plurality of piece goods, a deposit surface situated in the X-direction downstream from the receiving area for depositing piece goods picked by the conveyor, as well as a lateral recording device for producing at least one image of a piece good picked by the conveyor. According to the disclosure, the control device is configured so that the at least one image produced using the lateral recording device is processed in order to ascertain the dimensions of the picked piece good. If it should be established during processing that not all dimensions of the picked piece good were able to be ascertained from the image, the picked piece good is rotated by a predetermined angle about the Z-axis and another image is produced, which is then processed accordingly, this process being repeated until all dimensions of the piece good are ascertained.

The control unit predetermines by which angle the picked piece good is rotated, wherein this value may be a permanently programmed value or results from the processing of the preceding image. The orientation of the picked piece good is ascertained based on the results of the image processing or of the dimensions of the picked piece good, and the preferred storage surface of the picket piece good is established on the basis of specifications by the control device. The conveyor is then activated by the control device as a function of the orientation and of the preferred storage surface in such a way that a picked piece good is situated on a preferred storage surface on the deposit surface.

The device according to the disclosure thus includes not only a 3D recording device for establishing the piece good that is to be removed next from the stock, but another recording device, which creates one or multiple images of the picked piece good, wherein based on this image or these images, it is possible to determine the dimensions of the picked piece good so that the orientation of the picked piece good may be ascertained. The dimensions of the picked piece good namely cannot readily be taken from the 3D image of the upper 3D detection device, since it is not ensured that the entire piece good is detected by the upper 3D detection device. Furthermore, it is not routinely possible with the upper 3D recording device to ascertain the height of a piece good to be picked or of one that has been picked.

By using the lateral recording device, however, it is possible to easily determine the three dimensions of the picked piece good, so that the orientation of the picked piece good may be determined. For example, whether the largest bearing surface of the piece good is situated below, on the side, or on the end face of the piece good. The lateral recording device may be a 2D or 3D recording device. When using a 2D recording device, the picked piece good must be rotated about the vertical axis to determine all dimensions and at least two images must then be produced and evaluated. If a 3D recording device is used, with appropriate positioning of the 3D recording device, one image may suffice to determine all dimensions of the picked piece good. In such a case, however, a rotation about the Z-axis will also be regularly required.

A 3D camera may be used as a 3D recording device, for example. 3D cameras are camera systems that allow the visual representation of ranges of an entire scene. The term "3D cameras" is intended here to encompass, in particular, any of the following systems.

Stereo cameras, in which the environment is recorded simultaneously using two cameras, wherein the distance between the camera lenses usually corresponds to the distance between the human eyes. The resulting image pair may be processed in a computer (of a control device) and a depth map may thus be produced.

Triangulation systems, in which a light source images a defined pattern on the object. A camera records this pattern from a different angle and calculates the distance or a depth map based on the distortion.

Time of flight (TOF) cameras, which indicate the distance by measuring transit time of the light.

Interferometry systems, which operate using interferences between a measuring beam and an object beam.

Light field cameras, in which in addition to the brightness of a pixel, the light direction of the rays that result in a pixel is also recorded at the expense of the resolution using micro lens arrays, from which data a depth map may then be calculated.

With knowledge of the orientation of the picked piece good and taking into account a storage surface predetermined by the control device, which will routinely be the largest bearing surface of a piece good, the piece good may then be situated on precisely this storage surface on the deposit surface. Depending on the orientation of the picked piece good, it may be sufficient to simply deposit the piece good on the deposit surface, namely, when the piece good is picked on a preferred storage surface. For example, if the preferred bearing surface is provided by a side surface of the picked piece good, the piece good must be tipped after being deposited on the deposit surface, which may be done, for example, by the conveyor. For this purpose, the conveyor may be positioned next to the piece good and the piece good may then be tipped using the conveyor.

In one or more embodiments of the device according to the disclosure, the lateral recording device is designed as a 3D recording device. As stated previously above, the use of a 3D recording device reduces the images necessary for detecting all dimensions after the picking has occurred. Ideally, one 3D image is sufficient to ascertain all dimensions.

How exactly the conveyor is configured is contingent, in particular, on the expected dimensions and weights of the piece goods to be separated. In the case of a pharmacy picking device, these dimensions and weights are on the one hand relatively minimal, and on the other hand they are subject to relatively minimal fluctuations. In one or more embodiments, it is therefore provided that the conveyor is designed as a suction gripper movable in the X-, Y- and Z-directions and having at least one suction head rotatable about the Z-axis. The use of a suction gripper also allows such piece goods to be picked, the picking of which is otherwise prevented or hampered by unfavorably situated adjacent piece goods. The rotatability of the suction head about the Z-axis may be achieved by only the suction head itself being rotatable. In an aspect, the whole suction gripper or a component carrying the suction head may be rotatable about the Z-axis and thus "also rotate" the suction head.

In order to adapt the picking of a piece good to the dimensions of the piece good itself, it is provided in one or more embodiments of the picking device according to the disclosure that the suction gripper has two differently dimensioned suction heads, so that depending on the situation, it is possible to select the suction head that is best suited for the next piece good to be picked. Thus, it is conceivable that the next piece good to be determined is one having a very narrow receiving surface, which may be reasonably grasped only with a small suction head. In other cases, it is conceivable that the selection of the larger suction head is more beneficial in order, in particular, to provide stability to the picked piece good on the suction head.

In order to be able to rapidly select between the at least two different suction heads, it is provided in one or more embodiments of the picking device that the suction head includes a rotary body, on which the suction heads are situated, wherein the rotary body is rotatable about a horizontally extending rotation axis. In a corresponding embodiment of the suction gripper, a rapid and structurally simple switch between the differently dimensioned suction heads is possible.

In one or more embodiments of the picking device according to the disclosure, it is provided that the deposit surface is designed to be rotatable. In this way, the deposited piece good may be even better prepared for subsequent storage or for the preceding removal from the deposit surface.

In one or more embodiments of the disclosure, a method is provided. The method includes a) using a feed device, a plurality of non-separated piece goods are situated in a receiving area extending in an X- and Y-direction, b) at least one 3D image of the plurality of non-separated piece goods is produced using an upper 3D recording device situated in a Z-direction, orthogonal to the X- and Y-directions above the feed device, c) the at least one 3D image is processed using a control device coupled to the 3D recording device for ascertaining the position of the non-separated piece goods, and it is determined which piece good of the plurality of piece goods is picked next. Once such a piece good is determined, d) the piece good is picked using a gripper of a conveyor rotatable about the Z-axis, e) at least one image of the picked piece good is produced using a lateral recording device, coupled to the control device, and f) the at least one image produced by the lateral recording device is processed for ascertaining the dimensions of the picked piece good, g) wherein, if not all dimensions of the picked piece good is ascertained and the preferred storage surface of the picked piece good is established picked piece good are able to be determined, the picked piece good is rotated by a predetermined angle about the Z-axis and steps e) and f) are repeated until all dimensions of the picked piece good are ascertained, and h) based on the results of the image processing, the orientation of the picked piece good is ascertained and the preferred storage surface of the picked piece good is established on the basis of specifications by the control device.

Subsequently, i) the picked piece good is moved to a deposit surface situated in the X-direction downstream from the receiving area and j) the picked piece good is situated on a preferred storage surface on the deposit surface, which has been determined in method step f).

As previously indicated above, it may be sufficient, depending on the orientation of the picked piece good, to deposit it as picked, which is then sufficient if the piece good has been picked on a storage surface. If this is not the case, the piece good may be repositioned after an initial placement. In one or more embodiments of the method according to the disclosure, it is provided that the picked piece good is situated on a storage surface by first being situated on another surface on the deposit surface and then being tipped onto the storage surface. This may be carried out simply with the conveyor, for example, by moving the conveyor next to the piece good and tipping it using the conveyor.

In one or more embodiments of the method, it is provided that a 3D image of the picked piece good is produced using the lateral recording device. In this way, the number of images that are necessary for ascertaining the dimensions of the picked piece good may be reduced. Ideally, one 3D image is sufficient for determining all three dimensions.

In order to increase the flexibility when situating the piece good on the deposit surface, it is provided in one or more embodiments of the method that the picked piece good is rotated according to specifications of the control device about the Z-axis (e.g., the vertical axis), before being situated on the deposit surface. Thus, an optimal orientation for a subsequent storage may be achieved, wherein the optimal orientation may be contingent on, for example, the unoccupied spaces in the picking device.

Figure 1B:
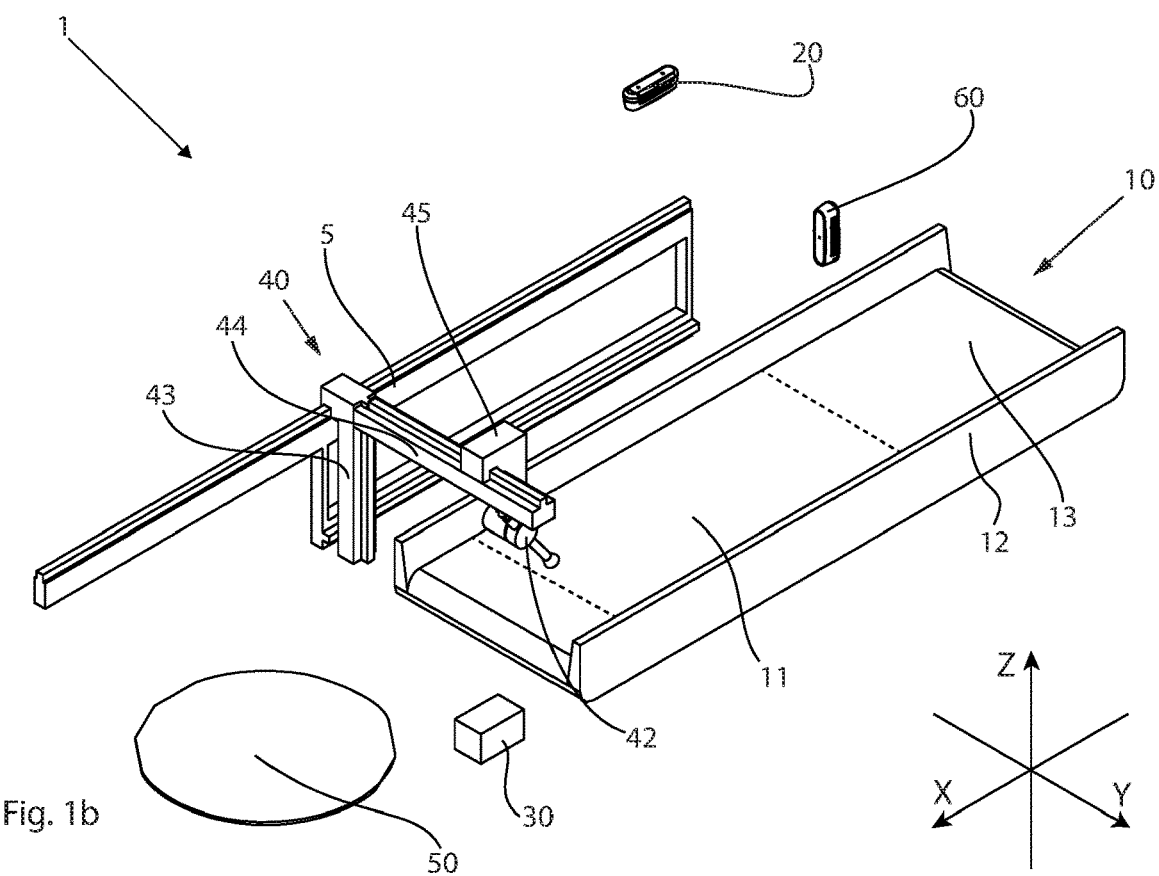
FIG. 1b is a perspective view of the device of FIG. 1a in which the detection areas of the recording devices indicated in FIG. 1a are omitted.

FIGS. 1a and 1b show oblique views of one or more embodiments of a device 1 according to the disclosure for separating piece goods to be stored in a picking device, wherein the piece goods may in particular be pharmaceutical product packages, which are to be stored in a pharmacy or hospital picking device. The device 1 includes a feed device 10, which in the embodiment shown includes a conveyor belt 13 having side strips 12, which are intended to prevent piece goods from falling off. As is indicated in FIG. 1b, an area 11 is provided in the "left" section of the conveyor belt, this area being a receiving area 11 in which piece goods are situated, as is apparent in the following figures. The receiving area 11 extends in the X- and Y-directions of the device, wherein the X- and Y-directions define a plane. In the Z-direction, which is situated orthogonal to the plane spanned by the X- and Y-directions, a 3D recording device 20 having a detection area 21 is situated above the feeding device 10, with which 3D images of the piece goods situated in the receiving area 11 are produced.

The picking device 1 further includes a guide frame 5 situated on the side of the feed device 10, on which a conveyor 40 is movably situated, which in the embodiment shown is designed as a suction gripper. The suction gripper includes a Z-guide 43, which is movable on the guide frame 5 in the X-direction. A Y-guide 44 is movable on this Z-guide 43 in the Z-direction, wherein, in turn, a holder 45 is movable on the Y-guide 44 in the Y-direction. A rotary body 42 is fixed on the holder 45 (or on a rotary body holder 46 shown in the following figures), to which in turn two grippers designed as suction heads are situated, as shown in greater detail with reference to the following figures.

Situated upstream from the conveyor 40 is a lateral recording device 60 having a detection area 61, and situated downstream from the feed device 10 is a deposit surface 50 for depositing piece goods picked by the conveyor 40. Further, the picking device 1 includes a control device 30, which is coupled via lines (not shown) to the upper 3D recording device 20, to the lateral recording device 60, as well as to the conveyor 40 and optionally to the feed device 10. According to the disclosure, the control device 30 is configured in such a way that an image produced using the lateral recording device 60 is processed for ascertaining the dimensions of the picked piece good.

The processing as well as the number of images depends on the type and functionality of the lateral recording device. If a 3D recording device is used, as is the case in the embodiment shown, it may be sufficient, with appropriate positioning of the recording device with respect to the receiving area 11, to produce merely one image of a picked piece good and to process it in order to ascertain all three dimensions. It will be routinely necessary, however, even when using a 3D recording device, to produce multiple 3D images in order to determine all dimensions. Before producing a subsequent image, the picked piece good is rotated by a predetermined angle X. In this case, the process is repeated until all three dimensions of the piece good are ascertained. If a 2D recording device is used, it is necessary in any case to produce at least two images that render the picked piece good in a different perspective. For this purpose, the piece good may be rotated, for example, 90° about the Z-axis once the first image is produced.

The orientation of the picked piece good is ascertained based on the results of the image processing, wherein it is also ascertained based on the orientation of the picked piece good where, for example, the largest bearing surface of the picked piece good is situated. Depending on the arrangement of the piece good before being picked, this arrangement may represent the suction surface of the piece good, and its mating surface, although it is also possible that the side surface or the end face relative to the X-direction of the device, is the largest bearing surface of the piece good.

The preferred storage surface of the picked piece good is established based on specifications of the control device, which is able to receive these specifications from a control device of a picking device, in which the piece goods are to be stored, wherein this preferred storage surface will routinely be the largest bearing surface of the picked piece good. The conveyor is then activated via the control device of the device for separating piece goods in such a way that a picked piece good is situated on a preferred storage surface on the deposit surface 50, this being described in greater detail with reference to the following figures.

Figure 2:
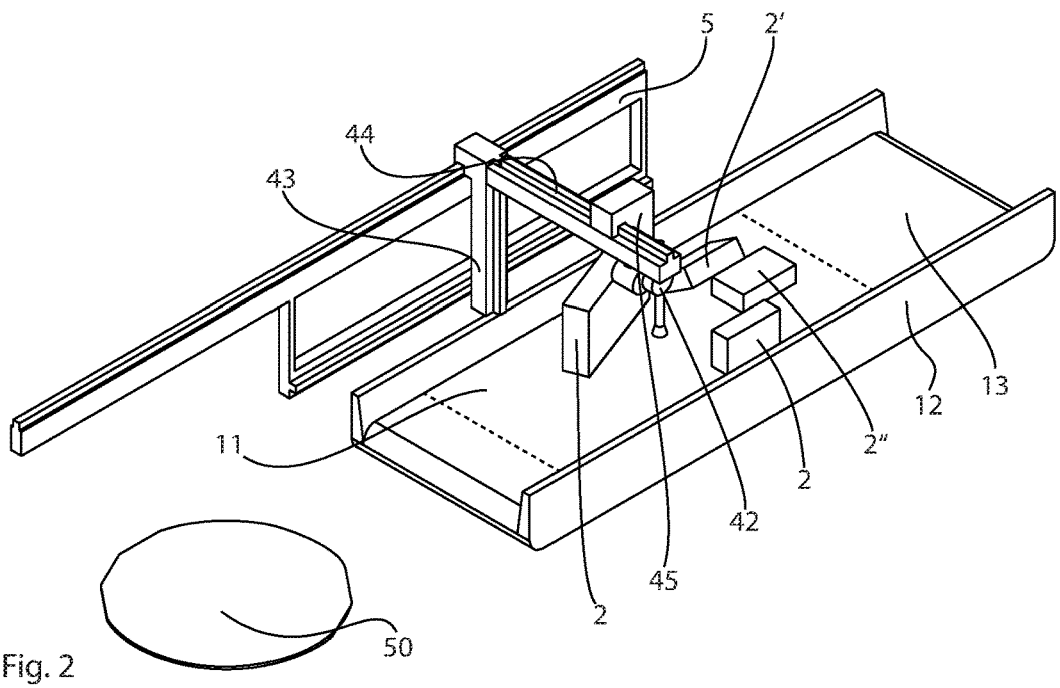
FIG. 2 is a perspective view of the device of FIG. 1a with piece goods.
Figure 3:
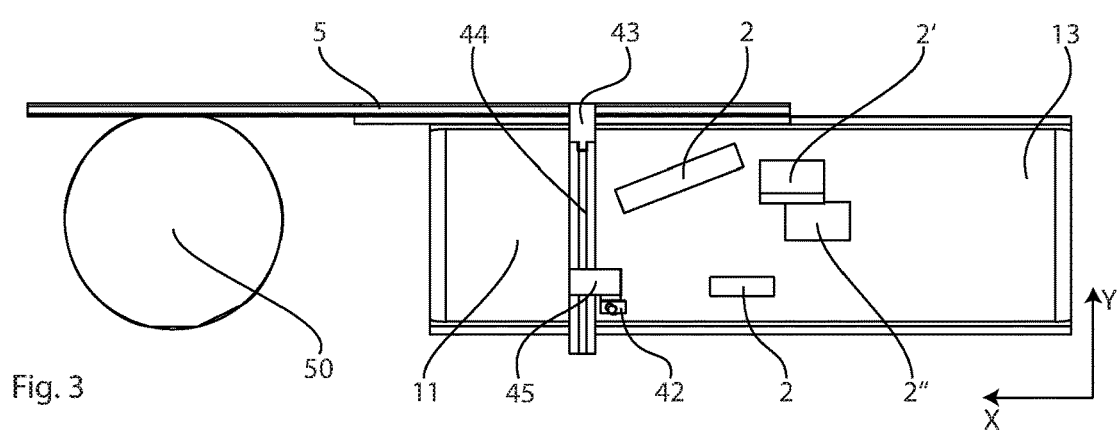
FIG. 3 is a top plan view of the device of FIG. 2.
Figure 4:
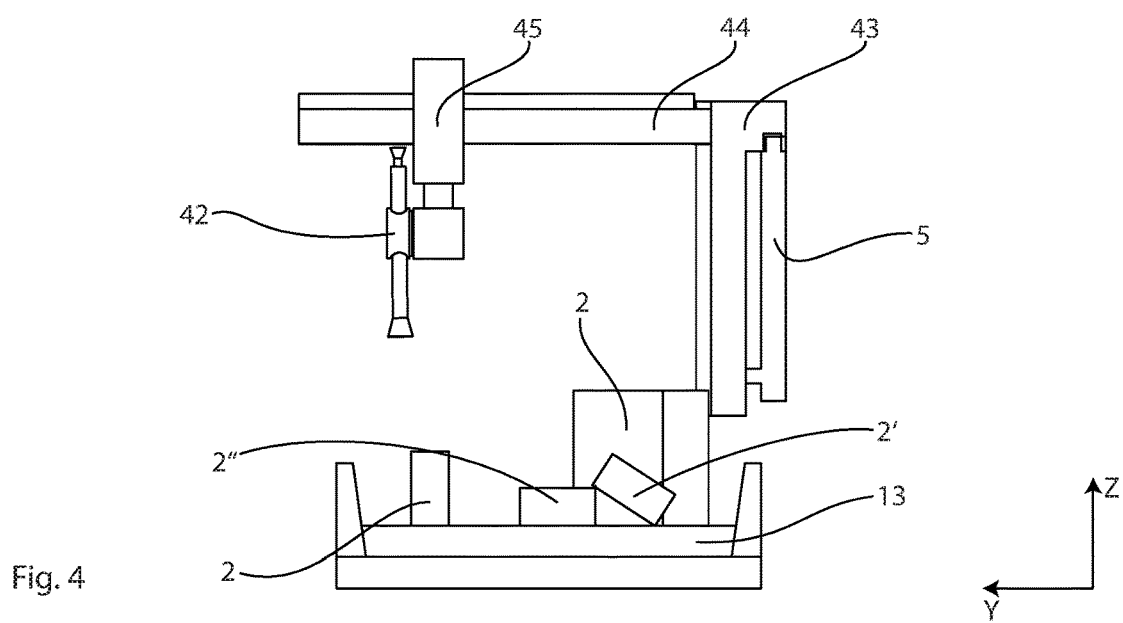
FIG. 4 is a rear view of the device of FIG. 2.
Figure 5B:
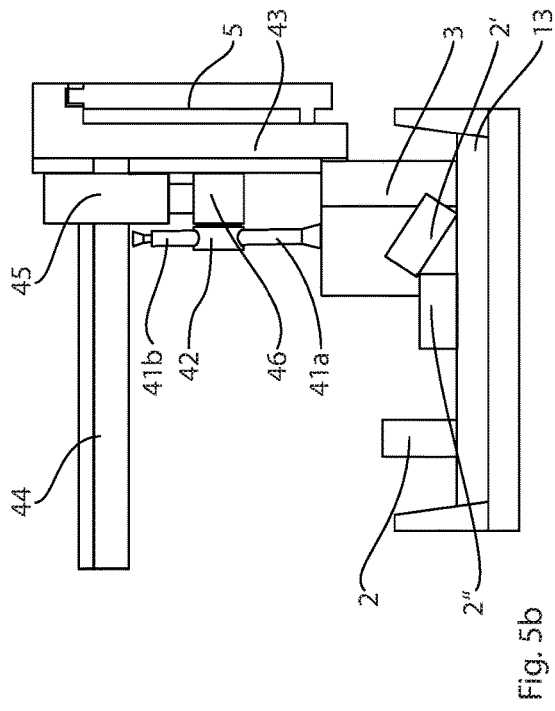

FIGS. 2, 3 and 4 show an oblique view, a top view and a rear view of the one or more embodiments of the device according to the disclosure, wherein four piece goods are situated in the receiving area 11 of the feed device 10 in FIGS. 2 through 4. Two of the piece goods, which are identified by the reference numeral 2, are situated freestanding in the receiving area. The piece good 2" is partially overlaid by the piece good 2', as is apparent, in particular, in the rear view of FIG. 4. In the rear view, the view is "from behind" over the feed device 10 in the X-direction toward the deposit surface 50, whereas in the front view, the view is from the deposit surface 50 in the X-direction toward the feed device 10. In the embodiment shown, the X-direction is determined by the transport direction of the piece goods from the receiving area 11 to the deposit surface 50 situated downstream.

FIGS. 5a, 5b, 6a, and 6b each show an oblique view and a rear view of different process situations during the separation of piece goods. In the process situation shown in FIGS. 5a and 5b, a suction head 41a of a suction gripper is placed on an upper side surface of a piece good 3. As is apparent in FIG. 5b, the suction gripper in the embodiment shown includes a central rotary body 42, which is rotatably mounted on a rotary body holder 46 about a horizontally formed rotation axis. Two suction heads are situated on the rotary body 42, namely, the suction head 41a seated on the piece good 3 and the suction head 41b situated oppositely thereof. As is apparent in FIGS. 5b and 6b, the diameter of the suction head 41a is greater than that of the suction head 41b, i.e., the suction head 41a is provided for picking larger piece goods or for placing it on larger surfaces of piece goods.

Figure 6B:
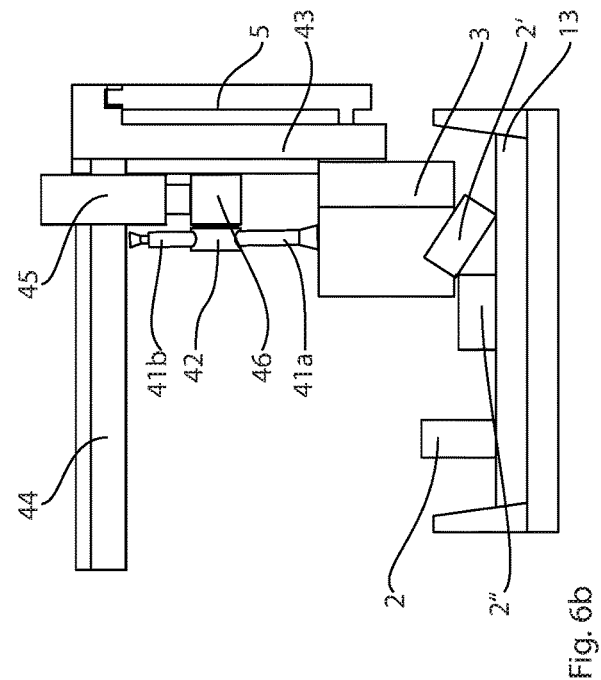
Figure 5A:
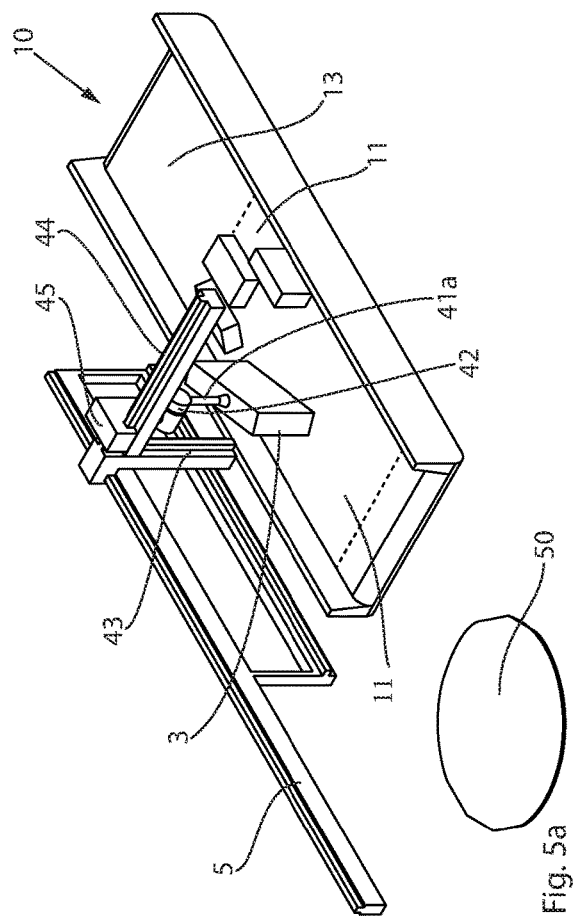
FIG. 5a is a perspective view of a first process situation of a method for separating piece goods to be stored in a picking device.
Figure 6A:
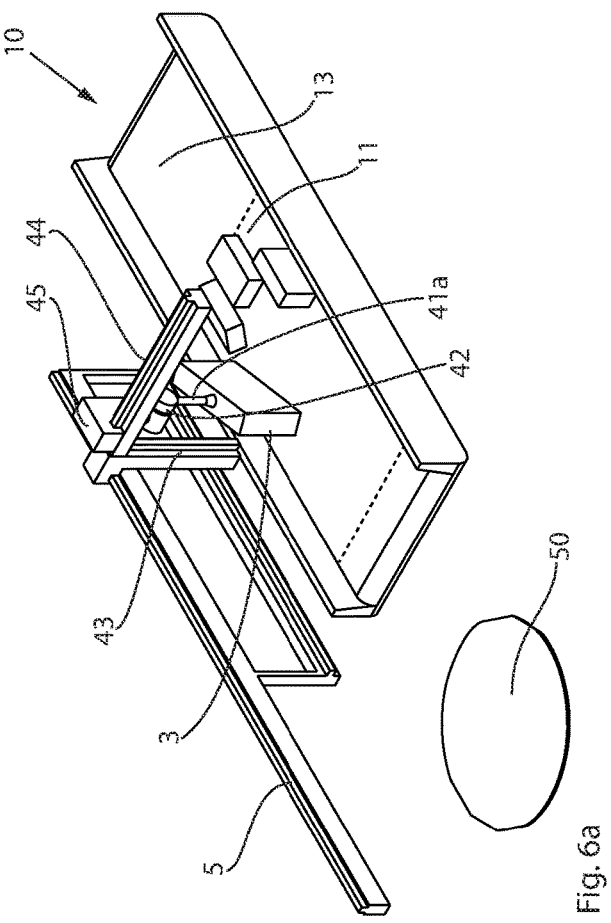
FIG. 6a is a perspective view of a second process situation of a method for separating piece goods to be stored in a picking device.

FIGS. 6a and 6b show a further advanced process situation in which the suction gripper on the Y-guide 44 has risen higher, wherein the piece good 3 is lifted from the receiving area 11 due to the suction effect by the suction gripper acting on the upper side surface. As can be seen from FIGS. 5a and 6a, as well as from the preceding figures, the piece good 3 is freely situated in the receiving area 11, so that no other piece good prevents the piece good 3 from being picked.

FIGS. 7a, 7b and 7c show front views of further process situations according to one or more embodiments of the method according to the disclosure. In FIG. 7a, the piece good 3 is set down on a deposit surface 50, namely, in the "left" portion of the deposit surface. As can be seen from FIG. 7a and from the preceding figures, the largest bearing surface in the case of the piece good 3 is a lateral surface of the piece good oriented in the X-direction, and in the one or more embodiments described here, this largest lateral surface is established as the storage surface. In order to then set the piece good 3 down on this storage surface, the conveyor 40 is moved in such a way that the suction head 41a is situated to the left of the piece good 3 in such a way that the suction head is located below the upper edge of the piece good 3. In order to move the piece good onto the storage surface, the suction gripper on the Y-guide 44 is moved to the right so that the piece good 3 is tipped over using the suction head 41a. The result is that the piece good, as shown in FIG. 7c, rests on the largest side surface intended as the storage surface. In this orientation, it may then be moved by an operating device (not shown) to, for example, a storage belt of the picking device (not shown), from where it is then moved to the final storage space.

FIGS. 8a and 8b show oblique views as a visual illustration of the process situations shown in FIGS. 7a and 7c.

Figure 9:
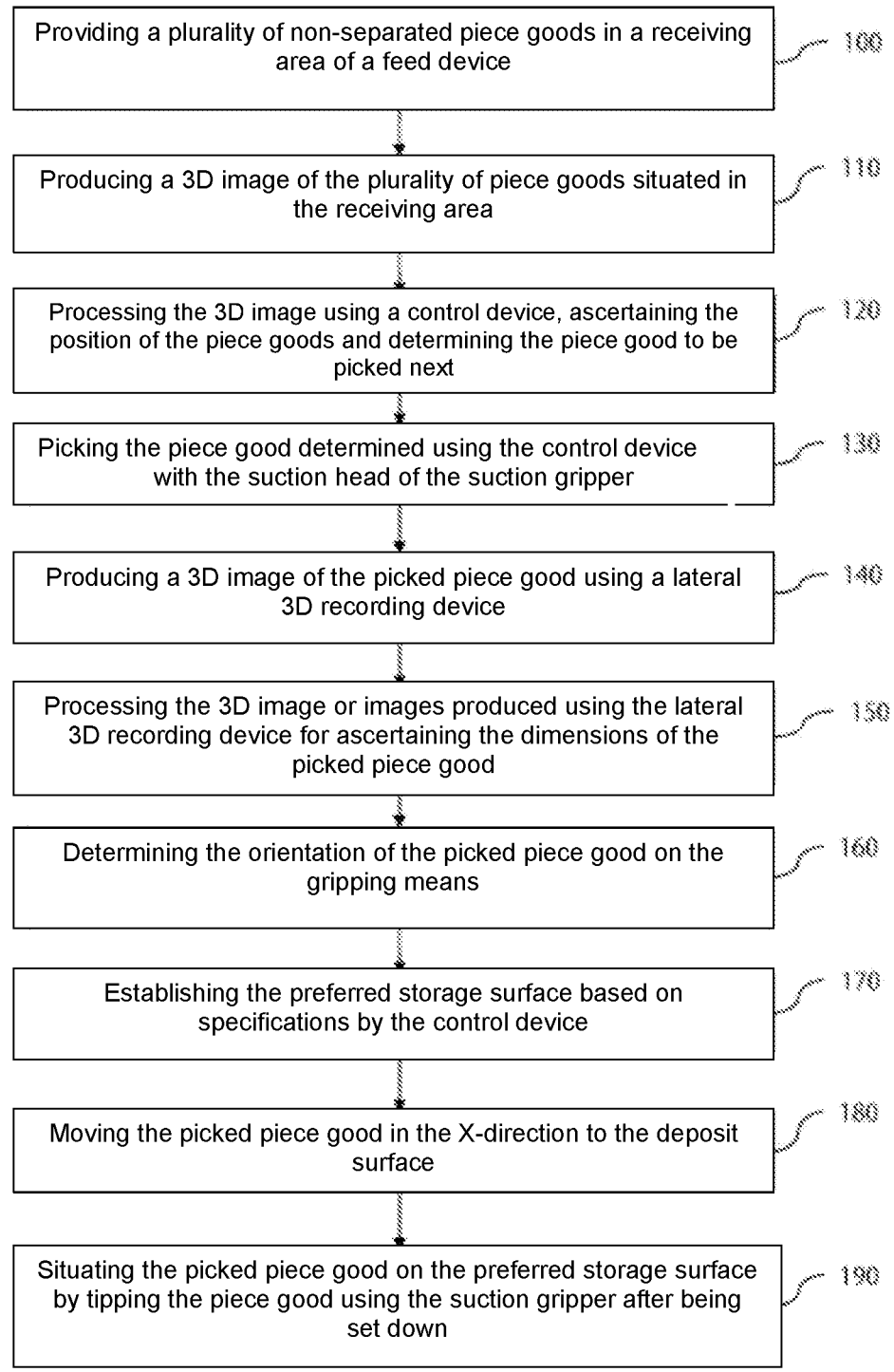
FIG. 9 is a flow chart of a method for separating piece goods to be stored in a picking device.

One or more embodiments of a method 90 according to the disclosure for separating piece goods to be stored in a picking device is described below with reference to the flow chart of FIG. 9. In a step 100, a plurality of non-separated piece goods are initially provided in a receiving area 11 of a feed device 10, as described in greater detail in the preceding figures. The piece goods may be, in particular, pharmaceutical product packages which are to be stored in a pharmacy picking device after being separated using the device according to the disclosure. Once the piece goods are provided, a 3D image of the plurality of piece goods is recorded in a step 110 using a 3D recording device (e.g., a simple 3D camera) situated above the feed device. This 3D image is processed in a step 120 using a control device 30, which is coupled to the 3D recording device, and the positions of the individual piece goods are ascertained. From this, the next piece good to be picked is determined, which is routinely a piece good that is not overlaid by other piece goods. In the preceding figures, this is, for example, the subsequently picked piece good 3.

The previously determined piece good is then picked in a step 130 using a suction head 41a of the suction gripper, namely, on the side surface of the piece good, which is most easily reached by the suction gripper. Once the piece good has been picked, a 3D image of the picked piece good is recorded in a step 140 using a laterally situated 3D recording device, which may also be a 3D camera. In a step 150, this 3D image is processed, namely, with the aim of ascertaining the dimensions of the picked piece good. In the event that it is not possible to ascertain all three dimensions based on the 3D image, the picked piece good is rotated by a predetermined value about the Z-axis and another 3D image is produced, which is subjected to a corresponding processing according to step 150. This is repeated until all dimensions have been ascertained.

The orientation of the piece good is determined in a step 160 on the basis of its dimensions. Thus, it may be established where, for example, the largest bearing surface of the piece goods is situated. It is conceivable, for example, that the piece good is picked via a largest receiving surface, which is situated laterally or at an end face with respect to the X-direction. Once the alignment is ascertained, the preferred storage surface is established in a step 170 based on specifications by the control device. The control device of the device according to the disclosure is routinely coupled to a control device of the picking device in which the piece goods are to be stored and, contingent upon the available storage spaces, the control device of the picking device may specify, for example, that all piece goods are to be stored in such a way that their longest side surface is to be oriented, for example, in the Y-direction. If there are no restrictions with regard to the storage space, however, it will regularly be the case that the largest bearing surface of a piece good is also the preferred storage surface, since this may ensure that the piece good may be stored safely and without risk of tipping in the picking device.

After or as the preferred storage surface is established, the picked piece good is moved in a step 180 in the X-direction to the deposit surface 50 on which the picked piece good is situated on the preferred storage surface in a step 190, wherein when the preferred storage surface is situated laterally, for example, the piece good is situated by using the suction gripper to tip the piece good after initially being set down.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A picking device, comprising:
   a feed device;
   a first recording device disposed adjacent to the feed device;
   a second recording device disposed adjacent to the feed device;
   a conveyor comprising a gripper; and
   a control device coupled to the first and second recording devices and the conveyor, the control device configured to have the gripper pick one of a plurality of piece goods based on one or more images from the first recording device, to have the second recording device take a first image of the picked piece good, to have the gripper rotate the picked piece good by a predetermined angle about an axis, and to have the second recording device take a second image of the picked piece good.

2. The picking device of claim 1, wherein the control device causes the rotation of the picked piece good and the second image to be taken by the second recording device when not all dimensions of the picked piece good are able to be determined by the control device based on the first image of the picked piece good from the second recording device.

3. The picking device of claim 1, wherein the control device is configured to determine an orientation of the picked piece good and establish a preferred storage surface of the picked piece good on the basis of specifications.

4. The picking device of claim 3, wherein the conveyor is configured to be activated as a function of the determined orientation of the picked piece good and of the established preferred storage surface in such a way that the picked piece good is situated on the preferred storage surface on a deposit surface downstream of a receiving area of the feed device.

5. The picking device of claim 1, wherein the first recording device comprises a three dimensional recording device.

6. The picking device of claim 1, wherein the second recording device comprises a two dimensional recording device.

7. The picking device of claim 1, wherein the second recording device comprises a three dimensional recording device.

8. The picking device of claim 1, wherein the conveyor comprises a suction gripper movable in first, second and third directions.

9. The picking device of claim 8, wherein the suction gripper comprises at least one suction head rotatable about an axis extending in the third direction.

10. The picking device of claim 8, wherein the suction gripper comprises two differently dimensioned suction heads.

11. The picking device of claim 10, wherein the suction gripper comprises a rotary body on which the two suction heads are situated, wherein the rotary body is rotatable about a horizontally extending rotation axis.

12. The picking device of claim 1, further comprising a deposit surface situated downstream from a receiving area of the feed device and configured to receive deposited piece goods picked by the conveyor.

13. The picking device of claim 12, wherein the deposit surface is rotatable.

14. A method for separating piece goods to be stored in a picking device, the method comprising:
   situating, with a feed device, a plurality of piece goods in a receiving area;
   producing, by a first recording device disposed adjacent to the feed device, at least one first image of the plurality of piece goods;
   determining, by a control device, one of the plurality of piece goods to be picked based on the at least one first image;
   picking, by a gripper of a conveyor, the determined piece good;

producing, by a second recording device disposed adjacent to the feed device, at least one second image of the picked piece good;

determining, by the control device, dimensions of the picked piece good based on the at least one second image; and situating the picked piece good on a deposit surface downstream from the receiving area.

15. The method of claim 14, further comprising:
rotating the picked piece good by a predetermined angle about an axis;
determining, by the control device, additional dimensions of the picked piece good; and
repeating the above rotating and determining steps until all dimensions of the picked piece good are determined.

16. The method of claim 14, wherein a three dimensional image of the picked piece good is produced using the second recording device.

17. The method of claim 14, further comprising:
rotating the picked piece good about an axis according to specifications of the control device before situating the picked piece good on the deposit surface.

18. The method of claim 14, further comprising:
determining, by the control device, an orientation of the picked piece good; and
establishing a preferred storage surface of the picked piece good on the basis of specifications.

19. The method of claim 18, further comprising:
moving the picked piece good downstream from the receiving area; and
situating the picked piece good on the established preferred storage surface on the deposit surface.

20. The method of claim 14, further comprising:
rotating the picked piece good about an axis; and
scanning by the second recording device to determine an identifier.

* * * * *